(12) United States Patent
Watson et al.

(10) Patent No.: US 9,248,374 B2
(45) Date of Patent: Feb. 2, 2016

(54) REPLAY AND RESUMPTION OF SUSPENDED GAME

(71) Applicant: Sony Computer Entertainment Inc., Tokyo (JP)

(72) Inventors: Brian Michael Christopher Watson, San Francisco, CA (US); Victor Octav Suba Miura, Foster City (CA); Jacob P. Stine, La Honda, CA (US); Nicholas J. Cardell, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 168 days.

(21) Appl. No.: 13/631,725

(22) Filed: Sep. 28, 2012

(65) Prior Publication Data

US 2014/0094313 A1    Apr. 3, 2014

(51) Int. Cl.
*A63F 13/00* (2014.01)
*A63F 13/30* (2014.01)
*A63F 13/40* (2014.01)

(52) U.S. Cl.
CPC .................. *A63F 13/12* (2013.01); *A63F 13/10* (2013.01); *A63F 2300/209* (2013.01); *A63F 2300/6045* (2013.01); *A63F 2300/634* (2013.01)

(58) Field of Classification Search
CPC ......... A63F 13/10; A63F 13/12; A63F 13/33; A63F 13/40; A63F 13/42; A63F 13/497; A63F 2300/20; A63F 2300/407; A63F 2300/53; A63F 2300/538; A63F 2300/6045
USPC ..................................................... 463/42, 43
See application file for complete search history.

(56) References Cited

U.S. PATENT DOCUMENTS 6,009,458 A   12/1999  Hawkins et al.
6,402,620 B1   6/2002  Naghi
(Continued)

FOREIGN PATENT DOCUMENTS

EP   1172132 A   1/2002
EP   1225767 A   7/2002
(Continued)

OTHER PUBLICATIONS

PCT International Search Report and Written Opinion for International Application No. PCT/US2013/061023, dated Jan. 23, 2014.
(Continued)

*Primary Examiner* — James S McClellan
(74) *Attorney, Agent, or Firm* — Joshua D. Isenberg; JDI Patent

(57) ABSTRACT

A client device platform may provide an emulator with game inputs to advance an emulated game from a first state to a second state. The emulator may record the game inputs. Once the emulation of the game is suspended, the client device platform may deliver a replay request to the emulator. Upon receiving the replay request, the emulator may re-emulate the game inputs that have been stored in the emulator's memory. The re-emulation will produce the replay which may be delivered back to the client device platform. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

35 Claims, 10 Drawing Sheets

(56) References Cited

U.S. PATENT DOCUMENTS

| | | | |
|---|---|---|---|
| 7,159,008 | B1 | 1/2007 | Wies et al. |
| 7,286,132 | B2 | 10/2007 | Kuhne |
| 7,470,196 | B1 | 12/2008 | Joshi |
| 7,493,365 | B2 | 2/2009 | Wies et al. |
| 8,321,571 | B2 | 11/2012 | Crowder, Jr. et al. |
| 8,935,487 | B2 | 1/2015 | Sengupta et al. |
| 2002/0002510 | A1 | 1/2002 | Sharp et al. |
| 2002/0045484 | A1 | 4/2002 | Eck et al. |
| 2002/0065915 | A1 | 5/2002 | Anderson et al. |
| 2003/0037030 | A1 | 2/2003 | Dutta et al. |
| 2003/0190950 | A1 | 10/2003 | Matsumoto |
| 2003/0225560 | A1* | 12/2003 | Garcia et al. .................. 703/17 |
| 2004/0179019 | A1 | 9/2004 | Sabella et al. |
| 2004/0224772 | A1 | 11/2004 | Canessa et al. |
| 2004/0266529 | A1 | 12/2004 | Chatani |
| 2005/0195187 | A1 | 9/2005 | Seiler et al. |
| 2005/0288954 | A1 | 12/2005 | McCarthy et al. |
| 2006/0009290 | A1 | 1/2006 | Taho et al. |
| 2006/0080702 | A1 | 4/2006 | Diez et al. |
| 2006/0117260 | A1* | 6/2006 | Sloo et al. ..................... 715/719 |
| 2006/0146057 | A1 | 7/2006 | Blythe |
| 2006/0160626 | A1 | 7/2006 | Gatto et al. |
| 2006/0259292 | A1 | 11/2006 | Solomon et al. |
| 2007/0060361 | A1 | 3/2007 | Nguyen et al. |
| 2007/0298866 | A1* | 12/2007 | Gaudiano et al. .............. 463/23 |
| 2008/0032794 | A1 | 2/2008 | Ware et al. |
| 2008/0113749 | A1 | 5/2008 | Williams et al. |
| 2008/0282241 | A1 | 11/2008 | Dong |
| 2008/0300053 | A1 | 12/2008 | Muller |
| 2009/0082102 | A1 | 3/2009 | Sargaison et al. |
| 2009/0088236 | A1 | 4/2009 | Laude et al. |
| 2009/0098943 | A1 | 4/2009 | Weber et al. |
| 2009/0282139 | A1* | 11/2009 | Mejdrich et al. ............. 709/223 |
| 2009/0303245 | A1 | 12/2009 | Soupikov et al. |
| 2010/0088296 | A1 | 4/2010 | Periyagaram et al. |
| 2011/0013699 | A1 | 1/2011 | Persson |
| 2011/0098111 | A1 | 4/2011 | Saito et al. |
| 2011/0218037 | A1 | 9/2011 | Singh |
| 2011/0299105 | A1 | 12/2011 | Morrison et al. |
| 2012/0021840 | A1* | 1/2012 | Johnson et al. ................ 463/43 |
| 2012/0052930 | A1 | 3/2012 | Mcgucken |
| 2012/0142425 | A1 | 6/2012 | Scott et al. |
| 2012/0299940 | A1 | 11/2012 | Dietrich, Jr. et al. |
| 2013/0137518 | A1 | 5/2013 | Lucas |
| 2014/0004941 | A1 | 1/2014 | Christopher Watson et al. |
| 2014/0004949 | A1 | 1/2014 | Miura et al. |
| 2014/0004956 | A1 | 1/2014 | Miura et al. |
| 2014/0004957 | A1 | 1/2014 | Stine et al. |
| 2014/0004962 | A1 | 1/2014 | Miura et al. |
| 2014/0066177 | A1 | 3/2014 | Zalewski |
| 2014/0092087 | A1 | 4/2014 | Kazama et al. |
| 2014/0094299 | A1 | 4/2014 | Stine et al. |
| 2014/0094314 | A1 | 4/2014 | Watson et al. |
| 2014/0094315 | A1 | 4/2014 | Stine et al. |

FOREIGN PATENT DOCUMENTS

| | | |
|---|---|---|
| JP | 2012034793 A | 2/2012 |
| RU | 2364938 C2 | 8/2009 |
| WO | 2004024259 A | 3/2004 |

OTHER PUBLICATIONS

PCT International Search Report and Written Opinion for International Application No. PCT/US2013/061029, dated Jan. 23, 2014.

U.S. Appl. No. 13/631,740, entitled "Method for Creating a Mini-Game" to Brian Michael Christopher Watson et al., filed Sep. 28, 2012.

U.S. Appl. No. 13/631,785, entitled "Pre-Loading Translated Code in Cloud Based Emulated Applications" to Jacob P. Stine et al., filed Sep. 28, 2012.

U.S. Appl. No. 13/631,803, entitled "Adaptive Load Balancing in Software Emulation of GPU Hardware" to Takayuki Kazama and Victor Octav Suba Miura, filed Sep. 28, 2012.

U.S. Appl. No. 13/631,812, entitled "Method and Apparatus for Improving Efficiency Without Increasing Latency in Emulation of a Legacy Application Title" to Jacob P. Stine et al., filed Sep. 28, 2012.

U.S. Appl. No. 13/790,311, entitled "Adding Triggers to Cloud-Based Emulated Games" to Victor Octav Suba Miura et al., filed Mar. 8, 2013.

U.S. Appl. No. 13/790,320, entitled "Determining Triggers for Cloud-Based Emulated Games" to Victor Octav Suba Miura et al., filed Mar. 8, 2013.

U.S. Appl. No. 13/791,379, entitled "Suspending State of Cloud-Based Legacy Application" to Jacob P. Stine et al., filed Mar. 8, 2013.

U.S. Appl. No. 13/791,420, entitled "Conversion of Haptic Events Into Screen Events" to Brian Michael Christopher Watson and Victor Octav Suba Miura , filed Mar. 8, 2013.

U.S. Appl. No. 13/791,434, entitled "Haptic Enhancements for Emulated Video Game Not Originally Designed With Haptic Capabilities" to Victor Octav Suba Miura and Brian Michael Christopher Watson , filed Mar. 8, 2013.

Provisional U.S. Appl. No. 61/666,665 to Brian Michael Christopher Watson et al., filed Jun. 29, 2012.

Provisional U.S. Appl. No. 61/666,628 to Victor Octav Suba Miura et al., filed Jun. 29, 2012.

Provisional U.S. Appl. No. 61/666,645 to Victor Octav Suba Miura et al., filed Jun. 29, 2012.

Provisional U.S. Appl. No. 61/666,679 to Jacob P. Stine et al., filed Jun. 29, 2012.

Non-Final Office Action for U.S. Appl. No. 13/631,812, dated Mar. 28, 2014.

Non-Final Office Action for U.S. Appl. No. 13/790,311, dated Feb. 26, 2014.

Non-Final Office Action for U.S. Appl. No. 13/791,379, dated Mar. 27, 2014.

Non-Final Office Action for U.S. Appl. No. 13/791,420, dated Mar. 27, 2014.

Co-Pending U.S. Appl. No. 61/694,718, to Gary M. Zalewski, filed Aug. 29, 2012.

Co-Pending U.S. Appl. No. 61/794,811, to Victor Octav Suba Miura, filed Mar. 15, 2013.

Final Office Action for U.S. Appl. No. 13/791,420, dated Jun. 11, 2014.

International Search Report and Written Opinion for International Application No. PCT/US2013/074813, dated May 29, 2014.

Non Final Office Action for U.S. Appl. No. 13/790,311 dated Jun. 27, 2013 6 pages.

Non-Final Office Action for U.S. Appl. No. 13/790,320, dated Jun. 18, 2014.

Non-Final Office Action for U.S. Appl. No. 13/792,664, dated Jun. 23, 2014.

Non-Final Office Action for U.S. Appl. No. 13/791,434, dated Nov. 26, 2014.

Final Office Action for U.S. Appl. No. 13/631,812, dated Aug. 29, 2014.

Non-Final Office Action for U.S. Appl. No. 13/790,311, dated Sep. 9, 2014.

Non-Final Office Action for U.S. Appl. No. 13/631,785, dated Oct. 22, 2014.

Non-Final Office Action for U.S. Appl. No. 13/631,803, dated Oct. 14, 2014.

Non-Final Office Action for U.S. Appl. No. 13/791,379, dated Oct. 16, 2014.

Non-Final Office Action for U.S. Appl. No. 13/631,740, dated Oct. 21, 2014.

Final Office Action for U.S. Appl. No. 13/790,311, dated Mar. 27, 2015.

Final Office Action for U.S. Appl. No. 13/791,379, dated May 13, 2015.

Final Office Action for U.S. Appl. No. 13/631,803, dated Apr. 16,2015.

Non-Final Office Action for U.S. Appl. No. 13/791,420, dated Apr. 9, 2015.

Non-Final Office Action for U.S. Appl. No. 14/183,351, dated May 11, 2015.

(56) References Cited

OTHER PUBLICATIONS

Non-Final Office Action for U.S. Appl. No. 13/631,785, dated May 21, 2015.
Final Office Action for U.S. Appl. No. 13/790,320, dated Jan. 15, 2015.
Non-Final Office Action for U.S. Appl. No. 13/631,740, dated Feb. 27, 2015.
Playstation2, 2004, Grand Theft Auto—San Andreas.
Grand Theft Auto: San Andreas Guide—Territories, https://www.youtube.com/watch?v=5d2GY-gr, May 29, 2012.
GTA San Anreas How to start a gang war, https://www.youtube.com/watch?v=9N4908kGtLO, Jan. 13, 2013.
Final Office Action for U.S. Appl. No. 13/631,740, dated Jul. 27, 2015.
Non-Final Office Action for U.S. Appl. No. 13/631,803, dated Sep. 17, 2015.
Non-Final Office Action for U.S. Appl. No. 13/791,434, dated Jun. 23, 2015.
Final Office Action for U.S. Appl. No. 13/631,785, dated Dec. 4, 2015.
Final Office Action for U.S. Appl. No. 13/791,420, dated Oct. 9, 2015.
Non-Final Office Action for U.S. Appl. No. 13/790,311, dated Nov. 19, 2015.
Notice of Allowance for U.S. Appl. No. 14/183,351, dated Oct. 5, 2015.

\* cited by examiner

REPLAY AND RESUMPTION OF SUSPENDED GAME

CROSS-REFERENCE TO RELATED APPLICATION

This application is related to commonly-assigned, co-pending provisional application Ser. No. 61/666,628, filed Jun. 29, 2012, and entitled "DETERMINING TRIGGERS FOR CLOUD-BASED EMULATED GAMES", the entire disclosures of which are incorporated herein by reference.

This application is related to commonly-assigned, co-pending provisional application Ser. No. 61/666,645, filed Jun. 29, 2012, and entitled "HAPTIC ENHANCEMENTS FOR EMULATED VIDEO GAME NOT ORIGINALLY DESIGNED WITH HAPTIC CAPABILITIES", the entire disclosures of which are incorporated herein by reference.

This application is related to commonly-assigned, co-pending provisional application Ser. No. 61/666,665, filed Jun. 29, 2012, and entitled "CONVERSION OF HAPTIC EVENTS INTO SCREEN EVENTS", the entire disclosures of which are incorporated herein by reference.

This application is related to commonly-assigned, co-pending provisional application Ser. No. 61/666,679, filed Jun. 29, 2012, and entitled "SUSPENDING STATE OF CLOUD-BASED LEGACY APPLICATIONS", the entire disclosures of which are incorporated herein by reference.

This application is related to commonly-assigned, co-pending application Ser. No. 13/631,740, filed the same day as the present application, and entitled "METHOD FOR CREATING A MINI-GAME" to Brian Michael Christopher Watson, Victor Octav Suba Miura, and Jacob P. Stine, the entire disclosures of which are incorporated herein by reference.

This application is related to commonly-assigned, co-pending application Ser. No. 13/631,785, filed the same day as the present application, and entitled "PRE-LOADING TRANSLATED CODE IN CLOUD BASED EMULATED APPLICATIONS", to Jacob P. Stine, Victor Octav Suba Miura, Brian Michael Christopher Watson, and Nicholas J. Cardell the entire disclosures of which are incorporated herein by reference.

This application is related to commonly-assigned, co-pending application Ser. No. 13/631,803, filed the same day as the present application, and entitled "ADAPTIVE LOAD BALANCING IN SOFTWARE EMULATION OF GPU HARDWARE", to Takayuki Kazama and Victor Octav Suba Miura, the entire disclosures of which are incorporated herein by reference.

This application is related to commonly-assigned, co-pending application Ser. No. 13/631,812, filed the same day as the present application, entitled "METHOD AND APPARATUS FOR IMPROVING EFFICIENCY WITHOUT INCREASING LATENCY IN EMULATION OF A LEGACY APPLICATION TITLE", to Jacob P. Stine and Victor Octav Suba Miura, the entire disclosures of which are incorporated herein by reference.

FIELD OF THE DISCLOSURE

The present disclosure is related to video game emulation. Among other things, this application describes a method and apparatus for emulating a video game that includes generating a replay of an emulated title.

BACKGROUND OF THE INVENTION

When playing video games over a cloud-based network, one of the biggest concerns for game developers is the efficient use of the available network bandwidth. As such, gaming experiences that would otherwise be available during a non-cloud based gaming session may be eliminated in order to conserve the bandwidth. One such gaming experience that requires substantial bandwidth is replay functionality. The gameplay that is traditionally recorded for use in a replay is often stored in large files. This poses several problems. First, the replay must always be recorded since there is a possibility that the game player may want to view a replay at any stage of the game. The large file that is created may consume a substantial portion of available memory on the cloud-based server. In order to keep replay functionality, the length of the replay must be kept short, or there must be a large amount of memory dedicated to the storage of replay information. Second, when the game player requests a replay, the large file must be delivered over the cloud-based network. This service may consume a large portion of the bandwidth and result in poor performance to the game player, and others using the cloud-based network at that time.

Therefore, there is a need in the art for method and apparatus for recording replays of a video game and delivering the replay to the game player, which does not consume a large quantity of memory or bandwidth. It is within this context that aspects of the present disclosure arise.

DETAILED DESCRIPTION OF THE DRAWINGS

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

According to aspects of the present disclosure, a replay may be recorded while a client device platform is advancing an emulated game from a first state to a second state. A client device platform may first deliver a series of game inputs to an emulator. The game inputs may include a snapshot of the first state and one or more game inputs that advance the emulated game from the first state to a second state. When the emulator receives the game inputs, it begins to emulate the game in accordance with the inputs, while also recording the inputs with respect to the time they are received and storing them in a memory. The client device platform may then deliver a suspension request to the emulator. When the emulator receives the suspension request, it suspends the emulated game and may generate a snapshot of the game.

According to additional aspects of the present disclosure, the client device platform may deliver a replay request to the emulator at the same time as, or subsequent to the delivering of the suspension request. Upon receiving the replay request, the emulator will re-emulate the game inputs that have been stored in the emulator's memory. The re-emulation will produce the replay which may be delivered back to the client device platform.

According to additional aspects of the present disclosure, the client device platform may deliver a resume request to the emulator after the suspension request. Upon receiving the resume request, the snapshot generated during the suspension of the emulated game may be loaded by the emulator. Once the snapshot is loaded, the client device platform may continue delivering additional game inputs in order to advance the emulated game to a different state. According to additional aspects of the present disclosure, the emulator may load the snapshot generated before the resume request is delivered to the emulator.

Figure 1:
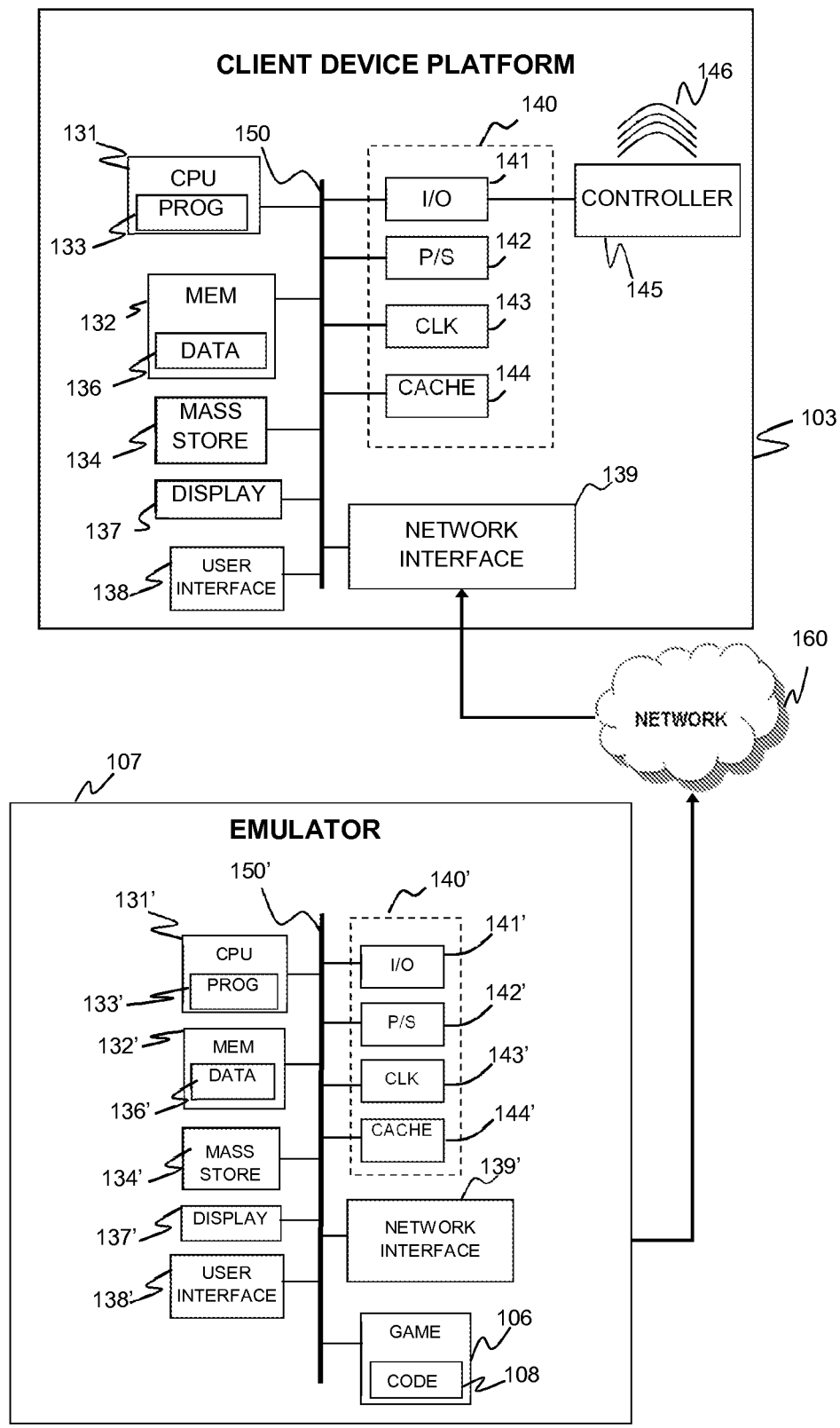
FIG. 1 is a schematic diagram of a client device platform and an emulator communicating over a network according to an aspect of the present disclosure.

FIG. 1 is a schematic diagram illustrating a system containing components that can implement emulation in accordance with aspects of the present disclosure. An emulator 107 may be accessed by a client device platform 103 over a network 160. The client device platform 103 may access alternative emulators 107 over the network 160. The emulators 107 may be identical to each other, or they may each be programmed to emulate unique legacy game titles 106 or unique sets of legacy game titles 106.

The client device platform 103 may include a central processor unit (CPU) 131. By way of example, a CPU 131 may include one or more processors, which may be configured according to any suitable processor architecture, e.g., a dual-core, quad-core, multi-core, or Cell processor architecture. The client device platform 103 may also include a memory 132 (e.g., RAM, DRAM, ROM, and the like). The CPU 131 may execute a process-control program 133, portions of which may be stored in the memory 132. The client device platform 103 may also include well-known support circuits 140, such as input/output (I/O) circuits 141, power supplies (P/S) 142, a clock (CLK) 143 and cache 144. The client device platform 103 may optionally include a mass storage device 134 such as a disk drive, CD-ROM drive, tape drive, or the like to store programs and/or data. The client device platform 103 may also optionally include a display unit 137 and a user interface unit 138 to facilitate interaction between the client device platform 103 and a user. The display unit 137 may be in the form of a cathode ray tube (CRT) or flat panel screen that displays text, numerals, or graphical symbols. The user interface unit 138 may include a keyboard, mouse, joystick, light pen, or other device. A controller 145 may be connected to the client device platform 103 through the I/O circuit 141 or it may be directly integrated into the client device platform 103. The controller 145 may facilitate interaction between the client device platform 103 and a user. The controller 145 may include a keyboard, mouse, joystick, light pen, hand-held controls or other device. The controller 145 may also be capable of generating a haptic response 146. By way of example and not by way of limitation, the haptic response 146 may be implemented in the form of mechanical vibrations or any other feedback corresponding to the sense of touch. The client device platform 103 may include a network interface 139, configured to enable the use of Wi-Fi, an Ethernet port, or other communication methods.

The network interface 139 may incorporate suitable hardware, software, firmware or some combination of two or more of these to facilitate communication via an electronic communications network 160. The network interface 139 may be configured to implement wired or wireless communication over local area networks and wide area networks such as the Internet. The client device platform 103 may send and receive data and/or requests for files via one or more data packets over the network 160.

The preceding components may exchange signals with each other via an internal system bus 150. The client device platform 103 may be a general purpose computer that becomes a special purpose computer when miming code that implements embodiments of the present invention as described herein.

The emulator 107 may include a central processor unit (CPU) 131'. By way of example, a CPU 131' may include one or more processors, which may be configured according to any suitable processor architecture, e.g., a dual-core, quad-core, multi-core, or Cell processor architecture. The emulator 107 may also include a memory 132' (e.g., RAM, DRAM, ROM, and the like). The CPU 131' may execute a process-control program 133', portions of which may be stored in the memory 132'. The emulator 107 may also include well-known support circuits 140', such as input/output (I/O) circuits 141', power supplies (P/S) 142', a clock (CLK) 143' and cache 144'. The emulator 107 may optionally include a mass storage device 134' such as a disk drive, CD-ROM drive, tape drive, or the like to store programs and/or data. The emulator 107 may also optionally include a display unit 137' and user interface unit 138' to facilitate interaction between the emulator 107 and a user who requires direct access to the emulator 107. By way of example and not by way of limitation a client device platform or engineer 103 may need direct access to the emulator 107 in order to program the emulator 107 to properly emulate a desired legacy game 106 or to add additional mini-game capabilities to a legacy game 106. The display unit 137' may be in the form of a cathode ray tube (CRT) or flat panel screen that displays text, numerals, or graphical symbols. The user interface unit 138' may include a keyboard, touchpad, touch screen, mouse, joystick, light pen, or other device. The emulator 107 may include a network interface 139', configured to enable the use of Wi-Fi, an Ethernet port, or other communication methods.

The network interface 139' may incorporate suitable hardware, software, firmware or some combination of two or more of these to facilitate communication via the electronic communications network 160. The network interface 139' may be configured to implement wired or wireless communication over local area networks and wide area networks such as the Internet. The emulator 107 may send and receive data and/or requests for files via one or more data packets over the network 160.

The preceding components may exchange signals with each other via an internal system bus 150'. The emulator 107 may be a general purpose computer that becomes a special purpose computer when running code that implements embodiments of the present invention as described herein.

The emulator 107 may access a legacy game 106 that has been selected by the client device platform 103 for emulation through the internal system bus 150'. There may be more than one legacy game 106 stored in the emulator. The legacy games may also be stored in the memory 132' or in the mass storage device 134'. Additionally, one or more legacy games 106 may be stored at a remote location accessible to the emulator 107 over the network 160. Each legacy game 106 contains game code 108. When the legacy game 106 is emulated, the game code 108 produces legacy game data 109. Legacy game data 109 may be received by the client device platform 103 and displayed on the display unit 137.

By way of example, a legacy game 106 may be any game that is not compatible with a client device platform 103. By way of example and not by way of limitation, the legacy game 106 may have been designed to be played on Sony Computer Entertainment's PlayStation console, but the client device platform 103 is a home computer. By way of example, the legacy game 106 may have been designed to be played on a PlayStation 2 console, but the client device platform 103 is a PlayStation 3 console. Further, by way of example and not by way of limitation, a legacy game 106 may have been designed to be played on a PlayStation console, but the client device platform 103 is a hand held console such as the PlayStation Portable (PSP) or Vita from Sony Computer Entertainment.

In some implementations, but not all, the emulator 107 may be a deterministic emulator. A deterministic emulator is an emulator that may process a given set of game inputs 347 the same way every time that the same set of inputs 347 are provided to the emulator 107. This may be accomplished by eliminating any dependencies in the code run by the emulator 107 that depend from asynchronous activity. Asynchronous activities are events that occur independently of the main program flow. This means that actions may be executed in a non-blocking scheme in order to allow the main program flow to continue processing. Therefore, by way of example, and not by way of limitation, the emulator 107 may be deterministic when the dependencies in the code 108 depend from basic blocks that always begin and end with synchronous activity. By way of example, basic blocks may be predetermined increments of code at which the emulator 107 checks for external events or additional game inputs 347. The emulator 107 may also wait for any activities that run asynchronously within a system component to complete before proceeding to the next basic block. When no asynchronous activities are running, the emulator 107 may be thought of as running all of the basic blocks of the code 108 in lock step. In such a case, the emulator 107 is sometimes said to be in a "steady state".

Figure 2A:
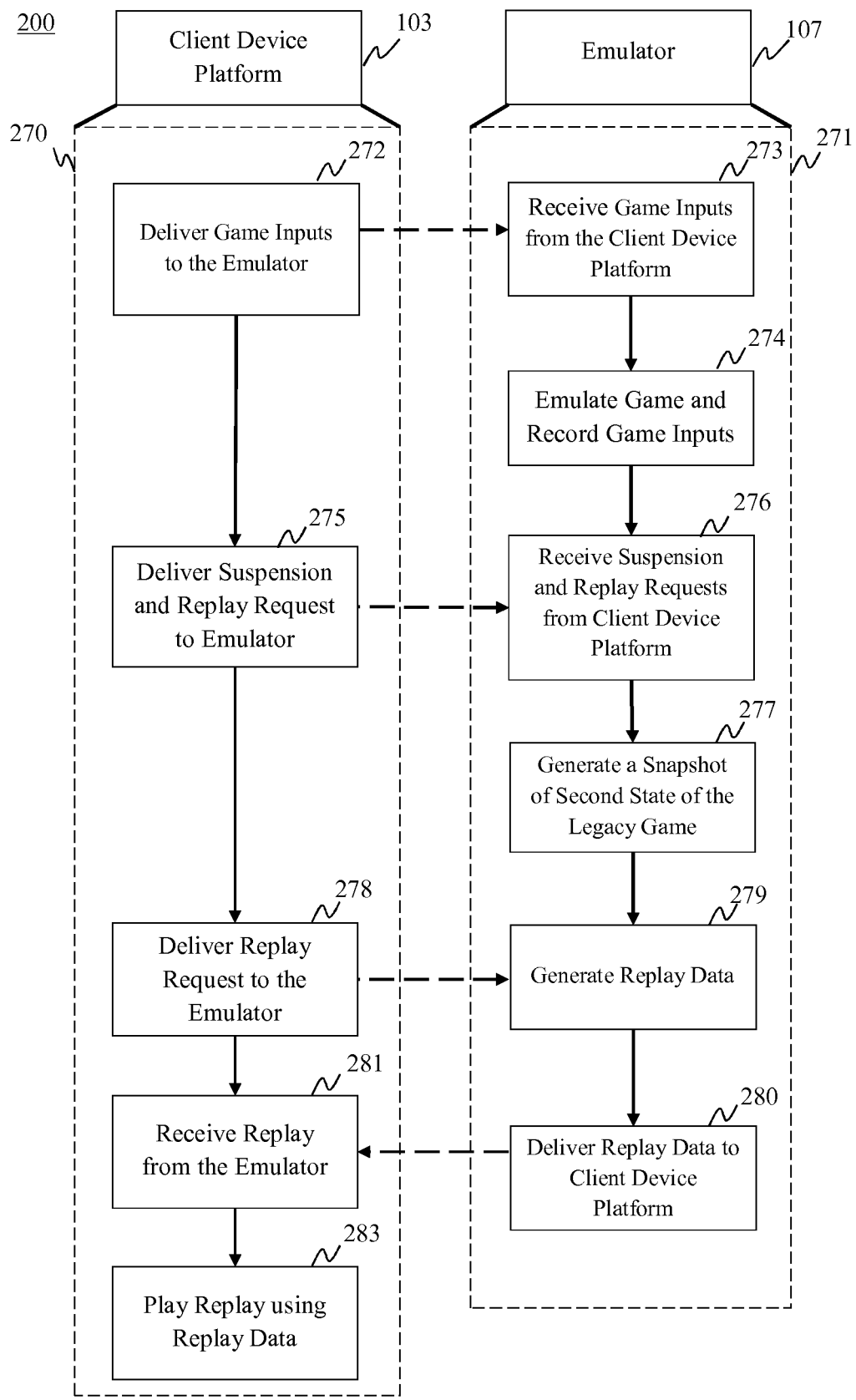
FIG. 2A is a flow diagram illustrating a method of producing a replay for an emulated game according to an aspect of the present disclosure.

As shown in FIG. 2A, the emulator 107 may be configured to implement a method for recording a replay of an emulated legacy game 106 according to an inventive method 200. Various aspects of the method 200 may be implemented by execution of computer executable instructions running on the client device platform 103 and/or the emulator 107 in conjunction with the actions of a client device platform 103. Specifically, a client device platform 103 may be configured, e.g., by suitable programming, to implement certain client device platform instructions 270. In addition, an emulator 107 may be configured to implement certain emulator instructions 271. In FIG. 2A the dashed arrows represent the flow of data between the client device platform 103 and the emulator 107 over the network 160.

Initially at 272, the client device platform 103 delivers game inputs 347 to the emulator 107 over the network 160. By way of example, and not by way of limitation, game inputs 347 may be commands that instruct the emulator 107 where to begin in an emulation routine, or they may be commands that control the game play of a legacy game 106 that is being emulated by the emulator 107. By way of example, and not by way of limitation, a game input 347 that instructs the emulator 107 where to begin in an emulation routine may be in the form of a previously generated snapshot 367. A snapshot may be a recorded description of the state of every device being emulated at a designated time during the emulation of a legacy game 106. Since the snapshot is taken when there is no asynchronous activity occurring in the emulator, the snapshot may be platform independent. Snapshots are described in greater detail in commonly-assigned, co-pending provisional application Ser. No. 61/666,679, filed Jun. 29, 2012, and entitled "SUSPENDING STATE OF CLOUD-BASED LEGACY APPLICATIONS". By way of example, and not by way of limitation, game inputs 347 may be automatically generated by the client device platform 103, or they may be provided to the client device platform 103 by an external source. By way of example, the game inputs 347 may be delivered to the emulator 107 all at the same time, or they may be delivered over a period of time.

By way of example, and not by way of limitation, game inputs 347 which control the game play may include commands that are generally used by a game player to advance the legacy game 106 from a first state 301 to a second state 302. The first state 301 may be stored as a first snapshot, and the second state 302 may be the state of the game when a suspension request 357 is delivered to the emulator 107. The game inputs 347 may be inputted by a controller 145. Game inputs 347 of this nature may include, but are not limited to, inputs that cause a main character 340 in a legacy game 106 to move to a new position, swing a sword, select an item from a menu, or any other action that can take place during the game play of a legacy game 106. Additionally, while game inputs advance the game play of the legacy game 106 from a first state 301 to a second state 302, there may also be one or more intermediate states generated. Each of the intermediate states may optionally be recorded as a snapshot 367. Additionally a suspension request 357 or replay request 358 may be made at any intermediate state as well.

Figure 3A:
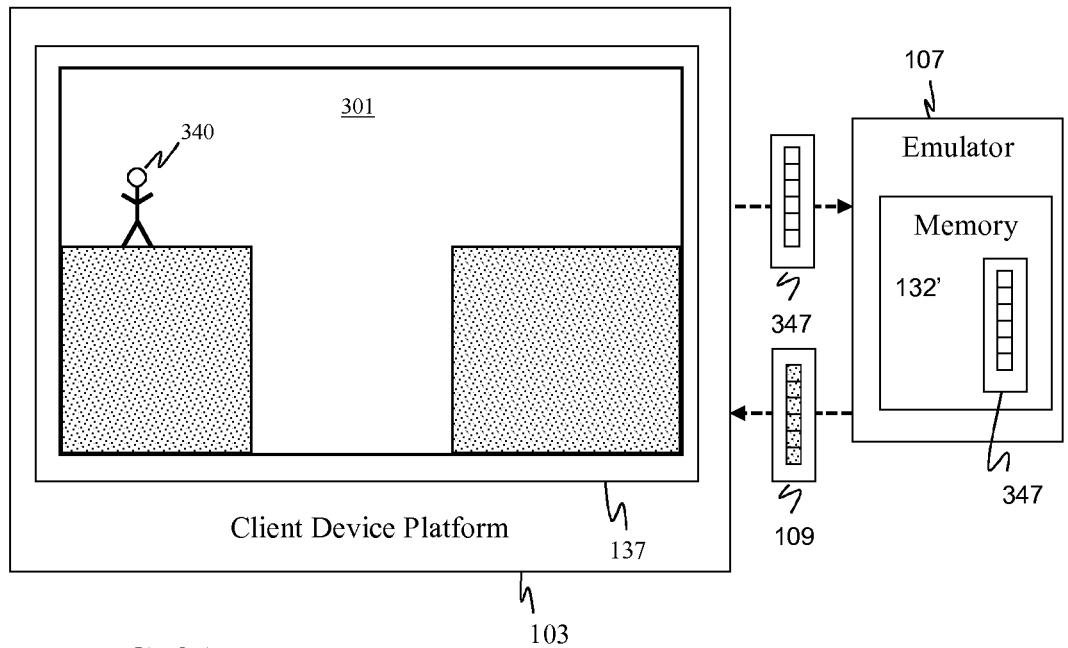
FIGS. 3A-3E are schematic diagrams illustrating the process of producing a replay of an emulated game and the process of resuming an emulated game according to various aspects of the present disclosure.
Figure 3B:
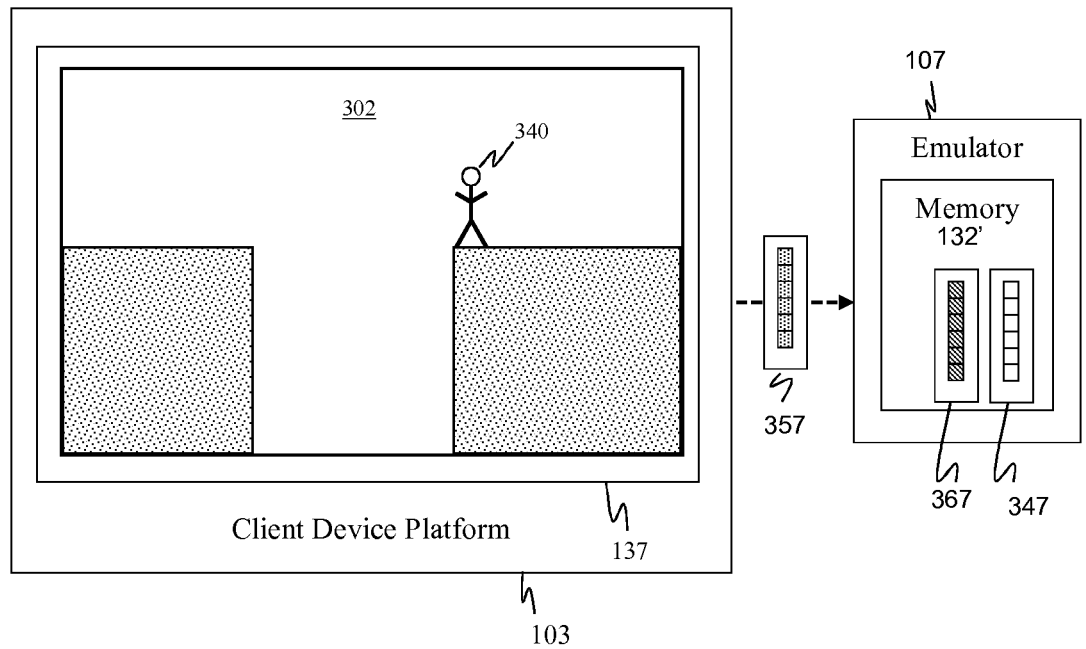

The emulator 107 receives the game inputs 347 at 273 and then proceeds to emulate the legacy game 106 in accordance with the game inputs 347 at 274. The emulation of the legacy game 106 causes the game to advance from a first state 301 to a second state 302. By way of example, and not by way of limitation, FIGS. 3A and 3B are schematics illustrating some examples of the emulation process according to certain aspects of the present disclosure. FIG. 3A depicts the client device platform 103 delivering game inputs 347 to emulator 107. While emulating the legacy game 106, the emulator 107 may deliver emulated game data 109 to the client device platform 103. The emulated game data 109 may contain data configured to display the progression of the game on the client device platform's 103 display unit 137. By way of example, the first state 301 of the legacy game 106 is displayed on the emulator's display unit 137' as a result of receiving the game data 109. According to this example of the disclosure, the first state 301 includes the main character 340 standing on the left side of a large trench.

Figure 4:
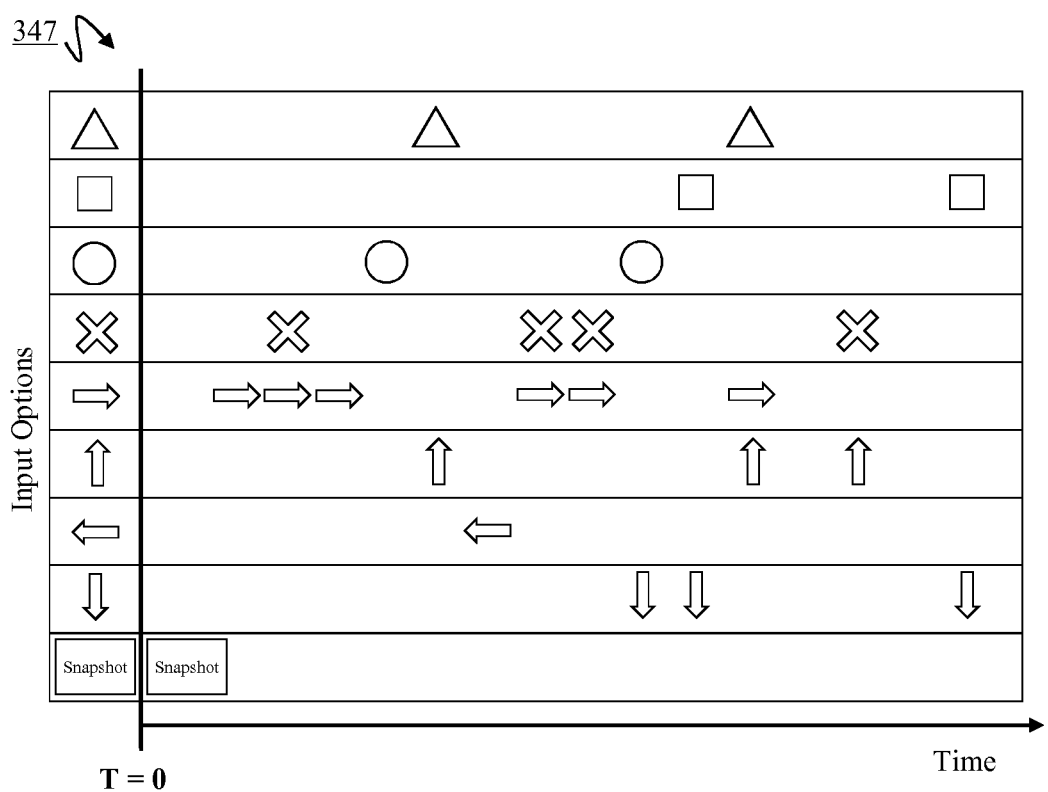
FIG. 4 is a chart that demonstrates how game inputs are recorded over time according to an aspect of the present disclosure.

In addition to emulating the legacy game 106, the emulator 107 may also record the game inputs 347 in a memory component. By way of example, the emulator 107 may store the recorded game inputs 347 to the emulator's 107 memory 132', or in its mass storage 134'. FIG. 4 is a schematic of game inputs 347 as they are delivered to the emulator 107 over a thin input channel. In FIG. 4 time is represented in the X-direction, and each possible game input may be divided into its own sub-channel (represented by the rectangles stacked in the Y-direction). By way of example, and not by way of limitation, FIG. 4 displays nine possible game input values, each of which is delivered over its own sub-channel of the input channel. While eight of the game inputs displayed in FIG. 4 correspond to a button on a controller 145, these are not the only types of game inputs 347 which will be recorded. By way of example, and not by way of limitation, snapshots may also be recorded as game inputs 347. It should be noted that there could be more or less game input values, and each sub-channel may be shared by one or more game input values. When recording the input values 347, the emulator 107 will also record when each input is delivered with respect to time. By way of example, and not by way of limitation, the recording may begin at T=0 and the first game input 347 is a snapshot of a first state 301. The recording may end when a suspension request 357 is delivered to the emulator.

Figure 3C:
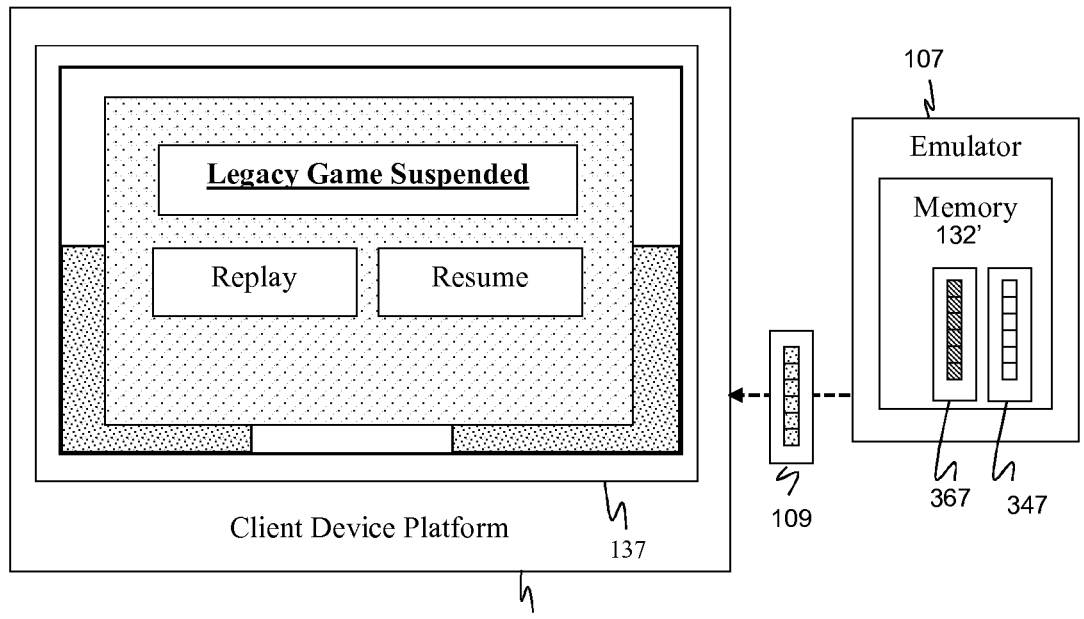

Once the client device platform 103 has provided sufficient game inputs 347 to advance the emulated game to a second state 302, the client device platform 103 may deliver a suspension request 357 to the emulator 107 at step 275. The suspension request 357 may be made by a user of the client device platform 103, or it may be automatically generated by the client device platform 103, or even the emulator 107. By way of example, and not by way of limitation, the suspension request may be automatically generated when there has been a lack of activity over a predetermined time period, a certain score is reached, or a predetermined game event has occurred. FIG. 3B illustrates an example of the client device platform 103 delivering the suspension request 357 to the emulator 107. In FIG. 3B, the second state 302 depicts the main character 340 standing just past the large trench. At 276, the emulator 107 may receive the suspension request 357 and (optionally) a replay request 358. Upon receiving the suspension request, the emulator 107 may suspend the emulation of the legacy game 106 and generate a snapshot 367 of the second state 302 at 277. When the emulation of the legacy game 106 has been suspended, the game data 109 delivered to the client device platform 103 may provide a visual indication that the legacy game 106 has been suspended. By way of example, and not by way of limitation, the visual indication may be a pause screen or a menu as shown on the display unit 137 in FIG. 3C.

Figure 3D:
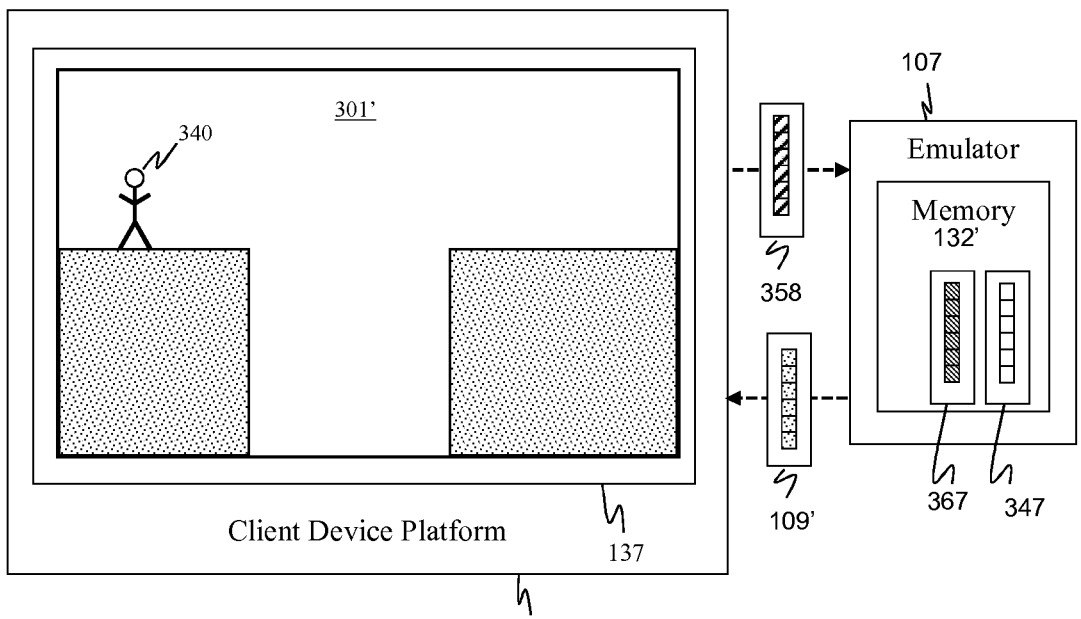

If the client did not deliver a replay request 358 with the suspension request 357, at 278 the client device platform 103 may separately deliver a replay request 358 to the emulator 107. After receiving the replay request 358, the emulator 107 may then begin to generate the replay game data 109' as indicated at 279. Instead of using recorded video of the actual gameplay, the replay game data 109' is produced by re-emulating the legacy game 106 from the point of suspension with the recorded game inputs 347. Since the emulator 107 may be a deterministic emulator, an exact replay of the original game play may be generated when the game inputs 347 are re-emulated in the same order. The replay game data 109' may also include time stamps associated with the game inputs 347 so that the recorded game inputs can be later played back in the same relative time sequence as the sequence in which they were recorded. By recording only the game inputs 347 and timestamps, fewer computer resources, such as memory and processing power, are required for generating a replay. The replay game data 109' is then delivered to the client device platform 103 at 280, and the client device platform receives the replay game data 109' from the emulator 107 at 281. The client device platform may then play a replay using the game data 109', as indicated at 283. FIG. 3D depicts the delivery of the replay request 358 and the resulting delivery of the replay game data 109'. As can be seen from the display unit 137, the legacy game 106 is taken back to the first state 301'. From the replayed first state 301', the replay game data 109' will advance the game from the first state 301' to the second state 302' by following the same sequence of events that occurred during the original course of play.

According to additional aspects of the present disclosure, the replay game data 109' may be played in slow-motion or in fast-forward. In order to control the speed of playback, the emulator 107 may have the emulation routine sped up or slowed down. By way of example, and not by way of limitation, it is possible to alter the speed of the replay, e.g., by throttling the emulation speed or accelerating the emulation to a speed that is faster than the original speed.

According to additional aspects of the present disclosure, the game inputs 347 may optionally be saved to a memory 132 on the client device platform 103. Thereafter, the replay may be recalled at any time in the future. Additionally, the saved game inputs 347 may be in a file format that is conducive to sharing between multiple client device platforms 103. Therefore, a replay may be viewed by multiple parties on multiple client device platforms 103.

Figure 5A:
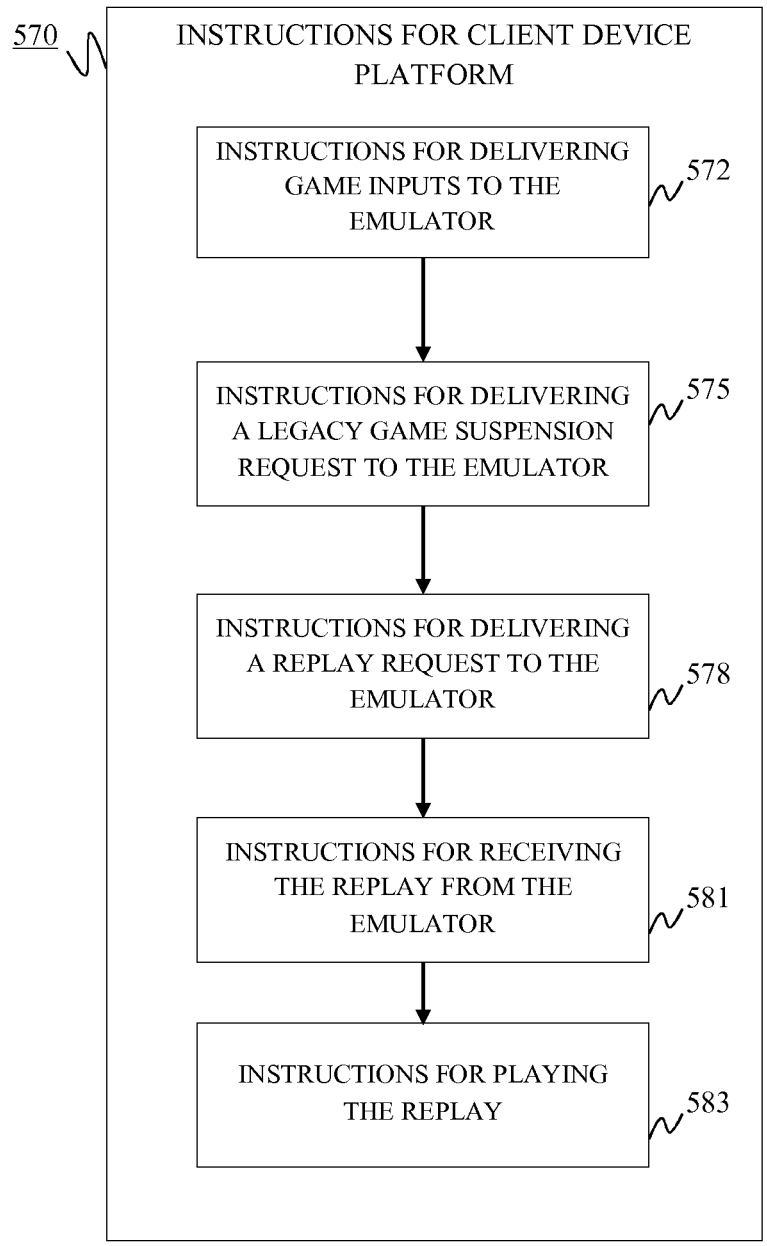
FIG. 5A is a block diagram describing computer-executable instructions for producing a replay with a client device platform according to an aspect of the present disclosure.

As shown in FIG. 5A, a set of client device platform instructions 570 may be implemented, e.g., by the client device platform 103. The client device platform instructions 570 may be formed on a nontransitory computer readable medium such as the memory 132 or the mass storage device 134. The client device platform instructions 570 may also be part of the process control program 133. The instructions 570 may include a first subset of instructions 572 that cause the client device to deliver legacy game input data 347 to the emulator, when executed. Thereafter the client device platform 103 may execute a second subset of instructions 575 that cause the client device platform to deliver a legacy game suspension request to the emulator 107, when executed. Next, the client device platform 103 may execute a third subset of instructions 578 to deliver a replay request 358 to the emulator 107. The client device platform may execute a fourth subset of instructions to receive the replay game data 109' from the emulator 107. Finally, the client device platform may execute a fifth subset of instructions 583 to play the replay using the game data 109' from the emulator 107. Specifically, the client device platform may use the game data 109' to generate the replay by disregarding inputs from a user, e.g., via a game controller, and instead sequentially implementing game actions in accordance with the recorded game inputs that are part of the game data 109' in the same manner that the client device would implement such inputs if they were received normally, e.g., from a game controller or other input device.

Figure 5B:
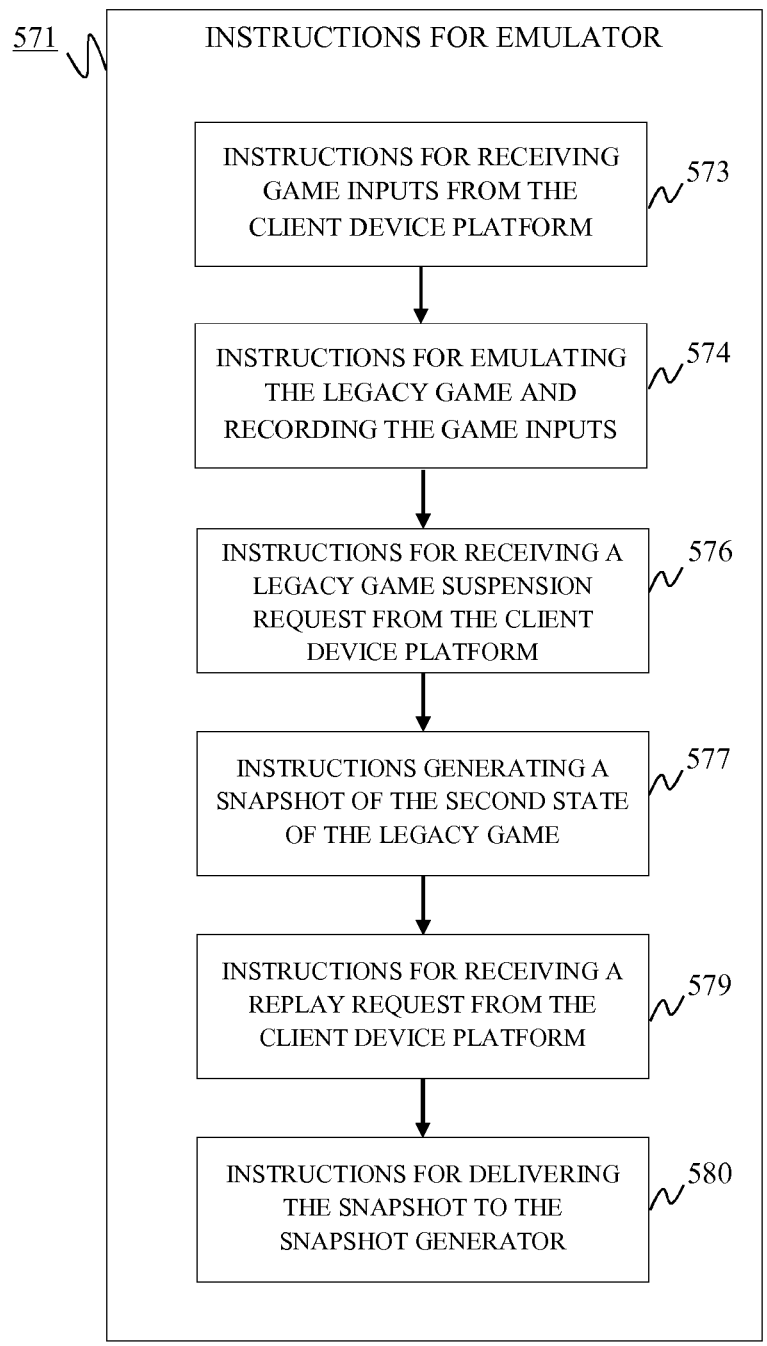
FIG. 5B is a block diagram describing computer-executable instructions for producing a replay with an emulator according to an aspect of the present invention.

As shown in FIG. 5B, a set of emulator instructions 571 may be implemented, e.g., by the emulator 107. The emulation instructions 571 may be formed on a nontransitory computer readable medium such as the memory 132' or the mass storage device 134'. The emulator instructions 571 may also be part of the process control program 133'. The instructions include receiving the game inputs 347 from the client device platform 103 at 573. Thereafter the emulator 107 is instructed to begin emulating the selected legacy game 106 and recording the game inputs 347 at 574. While emulating the legacy game 106, the emulator 107 is provided with instructions for receiving a legacy game suspension request 357 from the client device platform 103 at 576. Then at 577, the emulator 107 is instructed to generate a snapshot 367. The emulator 107 is then instructed to receive a replay request 358 from the client device platform 103 at 579. Finally, the emulator 107 is instructed to deliver the replay game data 109' to the client device platform 103 at 580.

Figure 2B:
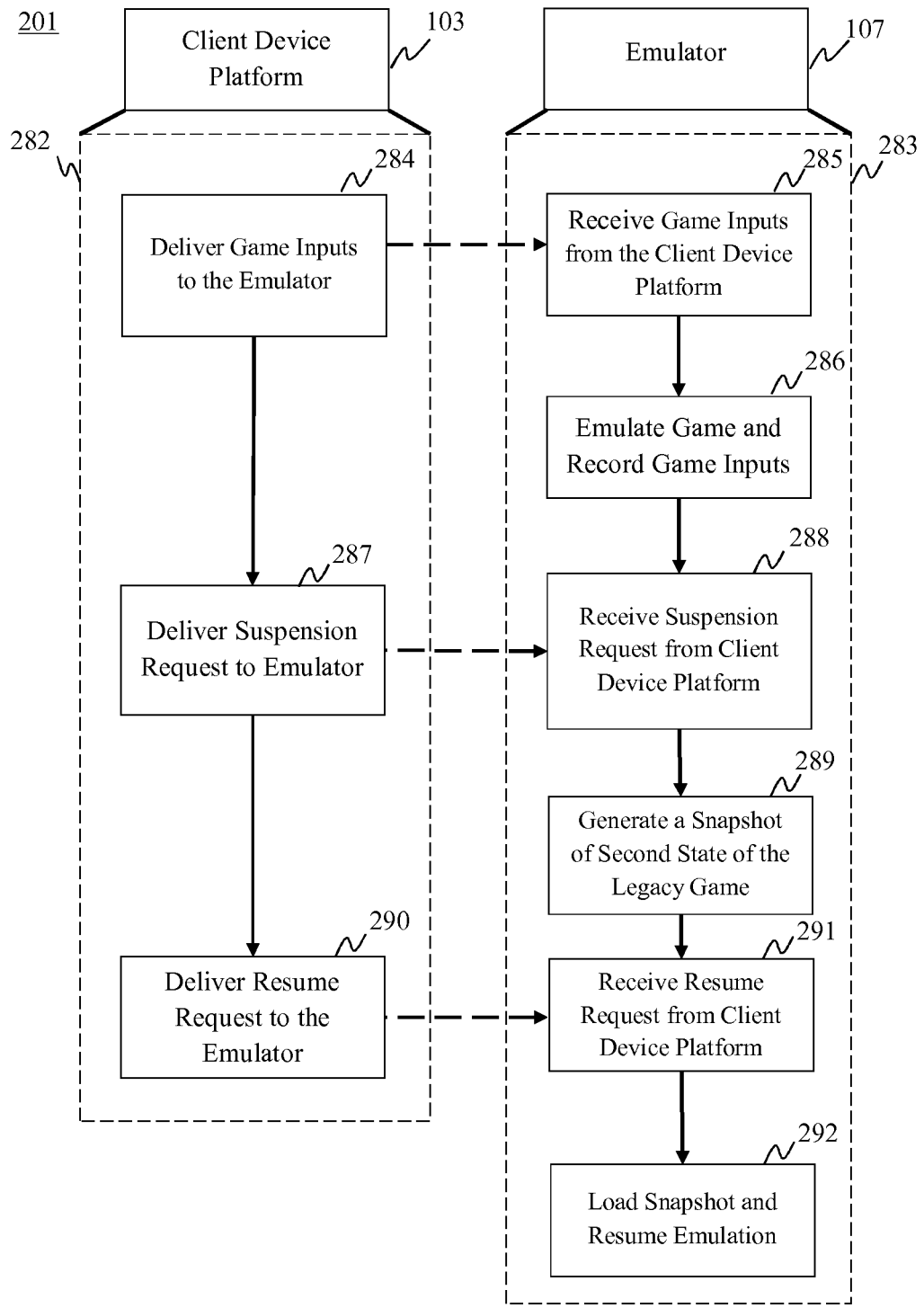
FIG. 2B is a flow diagram illustrating a method of resuming an emulated game according to an aspect of the present disclosure.

According to additional aspects of the present disclosure, the emulator 107 may also allow a legacy game 106 that has been suspended to be resumed. As shown in FIG. 2B, the emulator 107 may be configured to implement a method for resuming the emulation of a legacy game 106 according to an inventive method 201. Various aspects of the method 201 may be implemented by execution of computer executable instructions running on the client device platform 103 and/or the emulator 107 in conjunction with the actions of a client device platform 103. Specifically, a client device platform 103 may be configured, e.g., by suitable programming, to implement certain client device platform instructions 282. In addition, an emulator 107 may be configured to implement certain emulator instructions 283. In FIG. 2B the dashed arrows represent the flow of data between the client device platform 103 and the emulator 107 over the network 160.

Initially at 284, the client device platform 103 delivers game inputs 347 to the emulator 107 over the network 160. By way of example, and not by way of limitation, game inputs 347 may be commands that instruct the emulator 107 where to begin in an emulation routine, or they may be commands that control the game play of a legacy game 106 that is being emulated by the emulator 107. By way of example, and not by way of limitation, a game input 347 that instructs the emulator 107 where to begin in an emulation routine may be in the form of a previously generated snapshot 367. By way of example, and not by way of limitation, game inputs 347 may be automatically generated by the client device platform 103, or they may be provided to the client device platform 103 by an external source. By way of example, the game inputs 347 may be delivered to the emulator 107 all at the same time, or they may be delivered over a period of time.

By way of example, and not by way of limitation, game inputs 347 which control the game play may include commands that are generally used by a game player to advance the legacy game 106 from a first state 301 to a second state 302. The first state 301 may be stored as a first snapshot, and the second state 302 may be the state of the game when a suspension request 357 is delivered to the emulator 107. The game inputs 347 may be inputted by a controller 145. Game inputs 347 of this nature may include, but are not limited to, inputs that cause a main character 340 in a legacy game 106 to move to a new position, swing a sword, select an item from a menu, or any other action that can take place during the game play of a legacy game 106. Additionally, while game inputs 347 advance the game play of the legacy game 106 from a first state 301 to a second state 302, there may also be one or more intermediate states generated. Each of the intermediate states may optionally be recorded as a snapshot 367. Additionally a suspension request 357 may be made at any intermediate state as well.

The emulator 107 receives the game inputs 347 at 285 and then proceeds to emulate the legacy game 106 in accordance with the game inputs 347 at 286. The emulation of the legacy game 106 causes the game to advance from a first state 301 to a second state 302. By way of example, and not by way of limitation, FIGS. 3A and 3B are schematics of the emulation process according to certain aspects of the present disclosure. FIG. 3A depicts the client device platform 103 delivering game inputs 347 to emulator 107. While emulating the legacy game 106, the emulator 107 may deliver emulated game data 109 to the client device platform 103. The emulated game data 109 may contain data configured to display the progression of the game on the client device platform's 103 display unit 137. According to this example of the disclosure, the first state 301 consists of the main character 340 standing on the left side of a large trench.

Once the client device platform 103 has provided sufficient game inputs 347 to advance the emulated game to a second state 302, the client device platform 103 may deliver a suspension request 357 to the emulator 107 at step 287. By way of example, and not by way of limitation, the suspension request 357 may be automatically generated when there has been a lack of activity over a predetermined time period, a certain score is reached, or a predetermined game event has occurred. FIG. 3B is an example of the client device platform 103 delivering the suspension request 357 to the emulator 107. In FIG. 3B, the second state 302 depicts the main character 340 standing just past the large trench. At 288, the emulator 107 may receive the suspension request 357. Upon receiving the suspension request, the emulator 107 may suspend the emulation of the legacy game 106 and generate a snapshot 367 of the second state 302 at 289. When the emulation of the legacy game 106 has been suspended, the game data 109 delivered to the client device platform 103 may provide a visual indication that the legacy game 106 has been suspended. By way of example, and not by way of limitation, the visual indication may be a pause screen or a menu as shown on the display unit 137 in FIG. 3C.

Next, at 290 the client device platform 103 may deliver a resume request 359 to the emulator 107. The emulator 107 receives the resume request at 291 and then loads the snapshot 367 of the second state 302 and resumes emulation from that point at 292. In order to increase the speed of loading the snapshot, the snapshot 367 may be pre-loaded. Pre-loading snapshots and other emulated game data is described in greater detail in commonly-assigned, co-pending application Ser. No. 13/631,785, filed the same day as the present application, and entitled "PRE-LOADING TRANSLATED CODE IN CLOUD BASED EMULATED APPLICATIONS".

Figure 3E:
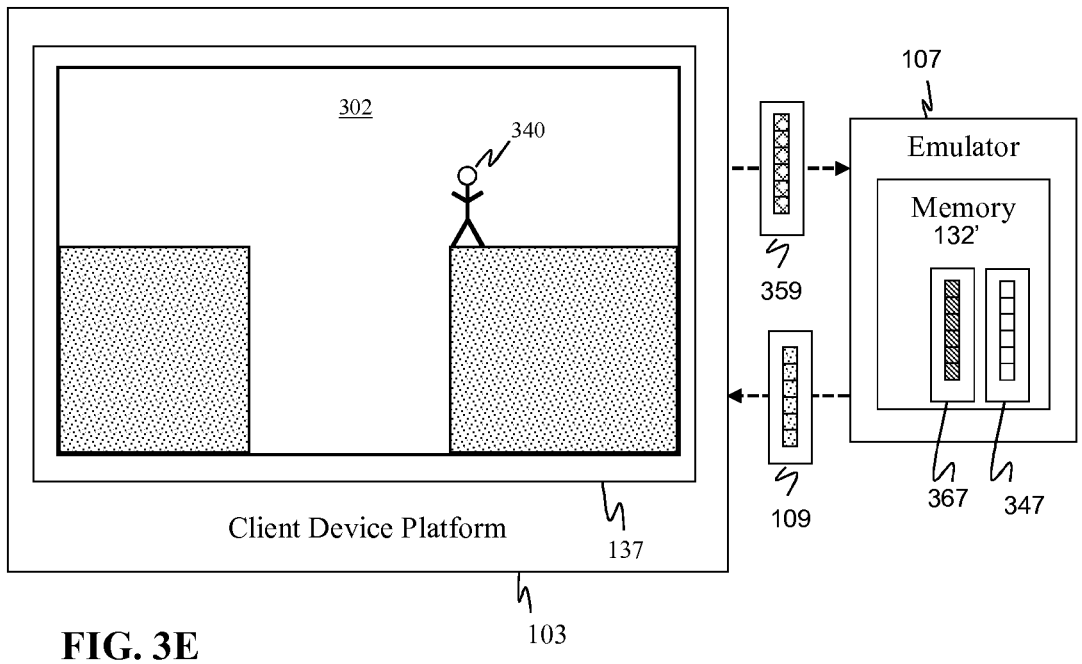

FIG. 3E depicts the delivery of the resume request 359 to the emulator 107. Once the snapshot 367 is loaded, game data 109 begins to be generated again as the emulator 107 resumes emulating the legacy game 106. The game data 109 in this example shows the game in the second state 302 again. From the second state 302, additional game inputs 347 may be delivered to the emulator 107 in order to advance the game to a new state.

Figure 6A:
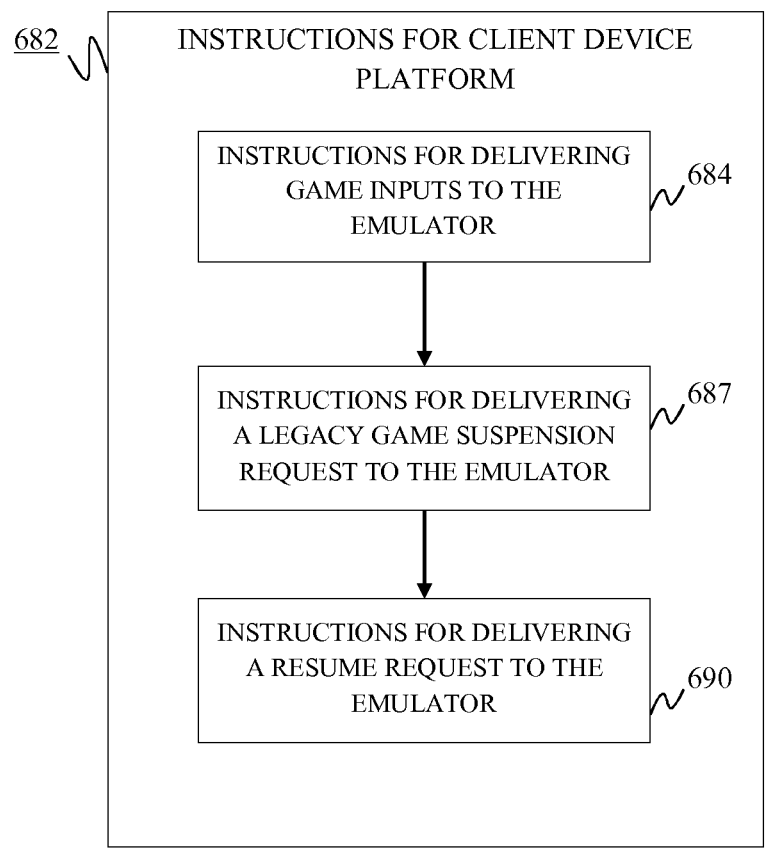
FIG. 6A is a block diagram describing computer-executable instructions for resumes an emulated game with a client device platform according to an aspect of the present disclosure

As shown in FIG. 6A, a set of client device platform instructions 682 may be implemented, e.g., by the client device platform 103. The client device platform instructions 670 may be formed on a nontransitory computer readable medium such as the memory 132 or the mass storage device 134. The client device platform instructions 670 may also be part of the process control program 133. The instructions include delivering legacy game input data 347 to the emulator at 684. Thereafter the client device platform 103 is instructed to deliver a legacy game suspension request to the emulator 107 at 687. Then, the client device platform 103 is instructed to deliver a resume request 359 to the emulator 107 at 690.

Figure 6B:
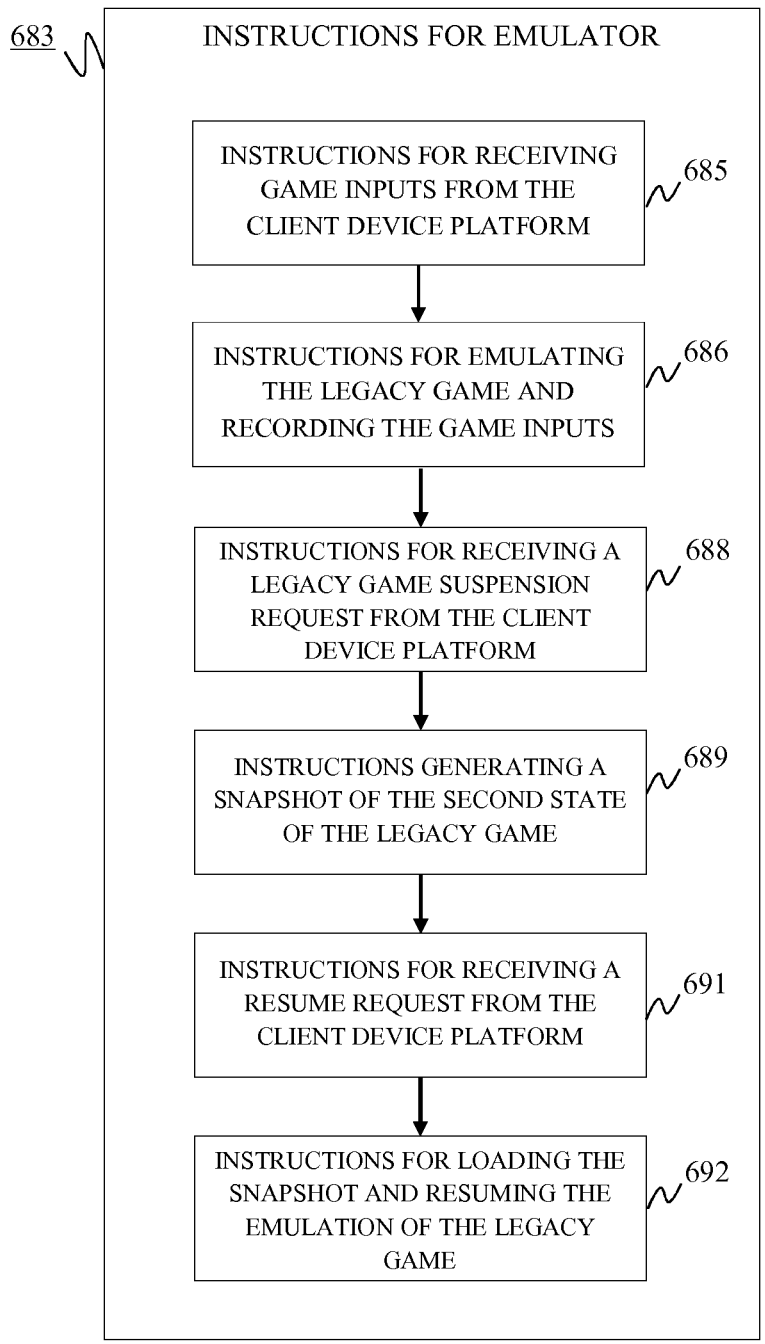
FIG. 6B is a block diagram describing computer-executable instructions for resuming an emulated game with an emulator according to an aspect of the present disclosure.

As shown in FIG. 6B, a set of emulator instructions 683 may be implemented, e.g., by the emulator 107. The emulation instructions 683 may be formed on a nontransitory computer readable medium such as the memory 132' or the mass storage device 134'. The emulator instructions 571 may also be part of the process control program 133'. The instructions include receiving the game inputs 347 from the client device platform 103 at 685. Thereafter the emulator 107 is instructed to begin emulating the selected legacy game 106 and recording the game inputs 347 at 686. While emulating the legacy game 106, the emulator 107 is provided with instructions for receiving a legacy game suspension request 357 from the client device platform 103 at 688. Then at 689, the emulator 107 is instructed to generate a snapshot 367. The emulator 107 is then instructed to receive a resume request 359 from the client device platform 103 at 691. Finally, the emulator 107 is instructed to load the snapshot 367 and resume the emulation of the legacy game 106 from that point at 692.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A nontransitory computer readable medium containing program instructions for generating a replay of an emulated game, and wherein execution of the program instructions by one or more processors of a computer system causes the one or more processors to carry out the steps of:
    a) receiving one or more game inputs from a client device platform over the network with the computer system, wherein the client device platform is remote from the computer system, wherein the one or more game inputs are utilized by the computer system to advance an emulated game from a first state to a second state;
    b) recording the one or more game inputs with the computer system;
    c) emulating the emulated game such that the emulated game is advanced to the second state with the computer system;
    d) receiving a suspension request from the client device platform over the network and suspending emulation of the emulated game with the computer system;
    e) receiving a replay request from the client device platform over the network with the computer system;
    f) generating a replay by re-emulating the emulated game with the one or more recorded game inputs with the computer system; and
    g) delivering the replay to the remote client device platform over the network with the computer system.

2. The non-transitory computer readable medium of claim 1, wherein the emulator is a deterministic emulator.

3. The non-transitory computer readable medium of claim 2, wherein the emulator uses basic blocks to emulate the game.

4. The non-transitory computer readable medium of claim 1, wherein the replay request is received at the same time as the suspension request.

5. The non-transitory computer readable medium of claim 1, wherein after receiving the suspension request from the client device platform, the method further comprises generating a snapshot of the emulated game, wherein the snapshot is a recording of a state of one or more devices being emulated by the emulator, and wherein each of the one or more devices is in a steady state.

6. The non-transitory computer readable medium of claim 5, wherein the one or more devices are in the steady state when there are no outstanding disk requests.

7. The non-transitory computer readable medium of claim 5, wherein the one or more devices are in the steady state when there is no asynchronous activity.

8. The non-transitory computer readable medium of claim 1, wherein the suspension request is received before the emulator has advanced the emulated game to the second state.

9. The non-transitory computer readable medium of claim 1, wherein the replay is configured to be displayed in fast-forward.

10. The non-transitory computer readable medium of claim 1, wherein the replay is configured to be displayed in slow motion.

11. The non-transitory computer readable medium of claim 1, wherein the replay is configured to be displayed at variable speeds.

12. The non-transitory computer readable medium of claim 1, wherein the one or more game inputs are received over a period of time.

13. In an emulator configured to operate on a network, a method for generating a replay of an emulated game, comprising:
    a) receiving one or more game inputs from a client device platform over the network at the emulator, wherein the emulator is remote from the client device, wherein the one or more game inputs are utilized by the emulator to advance an emulated game from a first state to a second state;
    b) recording the one or more game inputs;
    c) emulating the emulated game such that the emulated game is advanced to the second state;
    d) receiving a suspension request from the client device platform over the network and suspending emulation of the emulated game;
    e) receiving a replay request from the client device platform over the network;
    f) generating a replay by re-emulating the emulated game with the one or more recorded game inputs; and
    g) delivering the replay to the client device platform over the network.

14. An emulator configured to operate on a network, comprising:
    a processor;
    a memory coupled to the processor;
    one or more instructions embodied in memory for execution by the processor, the instructions being configured to generate a replay of an emulated game, the method comprising:
    a) receiving one or more game inputs from a client device platform over the network, wherein the emulator is remote from the client device, wherein the one or more game inputs are utilized by the emulator to advance an emulated game from a first state to a second state;
    b) recording the one or more game inputs;
    c) emulating the emulated game such that the emulated game is advanced to the second state;
    d) receiving a suspension request from the client device platform over the network and suspending emulation of the emulated game;
    e) receiving a replay request from the client device platform over the network;
    f) generating a replay by re-emulating the emulated game with the one or more recorded game inputs; and
    g) delivering the replay to the client device platform over the network.

15. A non-transitory computer readable medium containing program instructions for generating a replay of an emulated game, and wherein execution of the program instructions by one or more processors of a computer system causes the one or more processors to carry out the steps of:
   a) delivering one or more game inputs from a client device to an emulator that is remote from the client device over a network, wherein the game inputs are configured to be utilized by the emulator to advance an emulated game from a first state to a second state;
   b) delivering a suspension request to the emulator over the network;
   c) delivering a replay request to the emulator over the network; and
   d) receiving a replay of the emulated game from the emulator, wherein the replay includes one or more recorded game inputs; and
   e) presenting the replay of the emulated game with the client device using the one or more recorded game inputs.

16. The non-transitory computer readable medium of claim 15, wherein the suspension request is delivered to the emulator before the emulator has advanced the emulated game to the second state.

17. The non-transitory computer readable medium of claim 15, wherein the one or more game inputs are automatically generated.

18. The non-transitory computer readable medium of claim 15, wherein the one or more game inputs are delivered over a period of time.

19. The non-transitory computer readable medium of claim 15, wherein the suspension request and the replay request are delivered at the same time.

20. The non-transitory computer readable medium of claim 15, wherein the replay is configured to be displayed in fast-forward.

21. The non-transitory computer readable medium of claim 15, wherein the replay is configured to be displayed in slow motion.

22. The non-transitory computer readable medium of claim 15, wherein the replay is configured to be displayed at variable speeds.

23. In a client device platform configured to operate on a network, a method for generating a replay of an emulated game, comprising:
   a) delivering one or more game inputs from a client device to an emulator that is remote from the client device over a network, wherein the game inputs are configured to be utilized by the emulator to advance an emulated game from a first state to a second state;
   b) delivering a suspension request to the emulator over the network with the client device;
   c) delivering a replay request to the emulator over the network with the client device;
   d) receiving a replay of the emulated game from the emulator, wherein the replay includes one or more recorded game inputs with the client device; and
   e) presenting the replay of the emulated game with the client device using the one or more recorded game inputs with the client device.

24. A client device platform configured to operate on a network, comprising:
   a processor;
   a memory coupled to the processor;
   one or more instructions embodied in memory for execution by the processor, the instructions being configured to generate a replay of an emulated game, the method comprising:
   a) delivering one or more game inputs to an emulator that is remote from the client device over a network, wherein the game inputs are configured to be utilized by the emulator to advance an emulated game from a first state to a second state with the client device;
   b) delivering a suspension request to the emulator over the network with the client device;
   c) delivering a replay request to the emulator over the network with the client device; and
   d) receiving a replay of the emulated game from the emulator, wherein the replay includes one or more recorded game inputs with the client device; and
   e) presenting the replay of the emulated game with the client device using the one or more recorded game inputs with the client device.

25. A non-transitory computer readable medium containing program instructions for a suspending and resuming an emulated game, and wherein execution of the program instructions by one or more processors of a computer system causes the one or more processors to carry out the steps of:
   a) receiving one or more game inputs at the computer system from a client device platform over a network with the computer system, wherein the client device platform is remote from the computer system, wherein the one or more game inputs are utilized by the emulator to advance an emulated game from a first state to a second state;
   b) emulating the emulated game with the computer system such that the emulated game is advanced to the second state with the computer system;
   c) receiving a suspension request from the client device platform over the network with the computer system;
   d) generating a snapshot of the emulated game with the computer system, wherein the snapshot is a recording of a state of one or more devices being emulated by the emulator, and wherein each of the one or more devices is in a steady state;
   e) receiving a resume request from the client device platform over the network with the computer system;
   f) loading the snapshot, and resuming the emulation of the game with the computer system.

26. The non-transitory computer readable medium of claim 25, wherein the emulator is a deterministic emulator.

27. The non-transitory computer readable medium of claim 26, wherein the emulator uses basic blocks to emulate the game.

28. The non-transitory computer readable medium of claim 25, wherein the one or more devices are in the steady state when there are no outstanding disk requests.

29. The non-transitory computer readable medium of claim 25, wherein the one or more devices are in the steady state when there is no asynchronous activity.

30. The non-transitory computer readable medium of claim 25, wherein the suspension request is received before the emulator has advanced the emulated game to the second state.

31. The non-transitory computer readable medium of claim 25, wherein the one or more game inputs are received over a period of time.

32. The non-transitory computer readable medium of claim 25, wherein the snapshot is loaded before the resume request is received.

33. In an emulator configured to operate on a network, a method for suspending and resuming an emulated game, comprising:
   a) receiving one or more game inputs from a client device platform over the network with the emulator, wherein the emulator is remote from the client device platform, wherein the one or more game inputs are utilized by the emulator to advance an emulated game from a first state to a second state;
   b) emulating the emulated game with the emulator such that the emulated game is advanced to the second state;
   c) receiving a suspension request from the client device platform over the network with the emulator;
   d) generating a snapshot of the emulated game with the emulator, wherein the snapshot is a recording of a state of one or more devices being emulated by the emulator, and wherein each of the one or more devices is in a steady state;
   e) receiving a resume request from the client device platform over the network with the emulator;
   f) loading the snapshot, and resuming the emulation of the game with the emulator.

34. An emulator configured to operate on a network, comprising:
   a processor;
   a memory coupled to the processor;
   one or more instructions embodied in memory for execution by the processor, the instructions being configured to suspend and resume an emulated game, the method comprising:
   a) receiving one or more game inputs from a client device platform over the network, wherein the emulator is remote from the client device platform, wherein the one or more game inputs are utilized by the emulator to advance an emulated game from a first state to a second state with the emulator;
   b) emulating the emulated game with the emulator such that the emulated game is advanced to the second state;
   c) receiving a suspension request from the client device platform over the network with the emulator;
   d) generating a snapshot of the emulated game with the emulator, wherein the snapshot is a recording of a state of one or more devices being emulated by the emulator, and wherein each of the one or more devices is in a steady state;
   e) receiving a resume request from the client device platform over the network with the emulator;
   f) loading the snapshot, and resuming the emulation of the game with the emulator.

35. In a client device platform configured to operate on a network, a method for suspending and resuming an emulated game, comprising:
   a) delivering one or more game inputs to an emulator that is remote from the client device platform over a network with the client device, wherein the game inputs are configured to are utilized by the emulator to advance an emulated game from a first state to a second state;
   b) delivering a suspension request to the emulator over the network with the client device; and
   c) delivering a resume request to the emulator over the network with the client device.

* * * * *